United States Patent [19]
Naito

[11] 3,742,698
[45] July 3, 1973

[54] CIRCUIT FOR QUARTZ CRYSTAL TIMEPIECE

[75] Inventor: Okito Naito, Suwa, Japan

[73] Assignee: Kabushiki Kaisha Suwa Seikosha, Tokyo, Japan

[22] Filed: July 6, 1971

[21] Appl. No.: 160,021

[30] Foreign Application Priority Data

July 6, 1970 Japan .............................. 45/58528

[52] U.S. Cl. .................. 58/23 A, 307/225, 318/129
[51] Int. Cl. ... G04c 3/00, H03k 21/00, H02k 33/16
[58] Field of Search ............ 58/23 R, 23 A, 23 AC, 58/23 TF, 28 R; 318/129; 331/109, 113; 307/225 R

[56] References Cited

UNITED STATES PATENTS 3,363,410 1/1968 Imahash ................................ 58/34
3,560,998 2/1971 Walton ....................... 331/113 R X

FOREIGN PATENTS OR APPLICATIONS 1,168,682 10/1969 Great Britain ..................... 331/113

*Primary Examiner*—Stephen J. Tomsky
*Assistant Examiner*—Edith C. Simmons Jackmon
*Attorney*—Alex Friedman et al.

[57] ABSTRACT

A device for driving an electro-mechanical transducer of a timepiece from a quartz crystal oscillator including a switching circuit formed with an active element having an insulated gate type transistor and a bipolar type transistor. The electro-mechanical transducer is driven from said bipolar type transistor, which in turn is controlled and switched by the saturation current flowing through said insulated gate type transistor.

3 Claims, 4 Drawing Figures

PATENTED JUL 3 1973

3,742,698

CIRCUIT FOR QUARTZ CRYSTAL TIMEPIECE

BACKGROUND OF THE INVENTION

This invention relates to circuits in quartz crystal wrist watches or compact table clocks which change the high oscillating electric signal obtained from a crystal oscillator into a low oscillating electric signal for driving an electro-mechanical converter or transducer.

For timepiece application, these types of dividing and driving circuits must occupy a limited space and consume a limited amount of electric power. In the art, hybrid integrated circuits or monolithic bipolar integrated circuits are used for this purpose, but it is very difficult to obtain a compact circuit operated by a very small amount of electric power and suitable for mass production using such components. Accordingly, the use of integrated circuits including complementary MOS transistors has been suggested, since MOS transistors with both P and N channels operated by low voltage have now been developed. "MOS" is short for Metal-Oxide-Semiconductor. However, the use of only MOS transistors presents problems which are overcome by the arrangement according to the invention.

SUMMARY OF THE INVENTION

Generally speaking, in accordance with the invention, a circuit for a quartz crystal timepiece is provided including a switching circuit formed with an active element having an insulated gate type transistor and a bipolar type transistor. A load element is connected to said bipolar type transistor, the bipolar transistor being controlled by the saturation current flowing through the insulated gate type transistor, said load element being switched by said bipolar transistor. Said switching circuit forms a part of a divider electronic circuit provided intermediate a crystal oscillator and an electro-mechanical converter for the driving of said electro-mechanical converter.

Accordingly, the object of the circuit according to the invention is to provide a driving circuit for the electro-mechanical converter of a quartz crystal watch which is particularly adapted for mass production, is compact, and consumes a small amount of electric power.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWING

For a fuller understanding of the invention, reference is had to the following description taken in connection with the accompanying drawings, in which.

DESCRIPTION OF THE PREFERRED EMBODIMENTS

Figure 1:
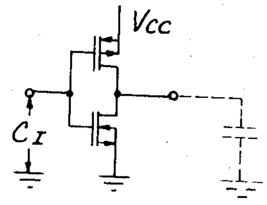
FIG. 1 is a circuit diagram of a complementary MOS transistor circuit.

Referring now to FIG. 1, the complementary MOS transistor circuit depicted has an input capacitance $C_I$, a switch frequency of $f$, and a power source voltage of $V_{cc}$. Power consumption $P$ of the circuit is as follows:

$$P = f \cdot C_I \cdot V_{cc}$$

In order to reduce the power consumption of the whole integrated circuit, the gate capacitance of the MOS transistor should be as small as possible.

The saturation current $I_{DS}$ flowing through a MOS transistor is determined by the geometrical size at drain, source and gate regions.

$$I_{DS} = ½ \cdot \mu \cdot C/L^2 \, (V_G - V_{G'})^2$$

wherein:

$\mu$: Mobility of electric charge in reversing the channel in P-type.

$C$ : Capacitance of gate oxide film $L$ : Length of channel $V_G$ : Supply gate voltage $V_{G'}$: Minimum gate voltage to turn enhancement type MOS transistor ON or minimum gate voltage to turn depletion type MOS transistor OFF.

If the gate capacitance is designed to be small in order to reduce the power consumption, the driving current for application to the converter is reduced by the saturation current of the MOS transistor and sufficient current to drive the converter cannot be obtained. The efficiency of the electro-mechanical converters now in use is not good, so these devices require substantial current.

Accordingly, if only complementary MOS transistors are used to drive the electro-mechanical converter, the driving transistor would require a large sized channel region and the chip incorporating the number of MOS transistor elements required becomes large. Such chips are expensive and not advantageous for mass production.

The object of this invention is to eliminate these disadvantages by using a chip including bipolar type transistors for the driving portion and a chip including complementary MOS transistors connected to the driving portion. In the arrangement according to the invention, the complementary MOS transistors of the frequency dividing portion of the circuits are designed in such a manner that the areas of the drain, source and gate are as small as possible in order to reduce current consumption. The saturation current of the complementary MOS transistors connected to the input of the bipolar type transistors for driving said bipolar type transistors is $1/\beta$ of the electric current necessary for driving the converter, so that the gate area thereof may be only a few times larger than the gate area of the dividing portion MOS transistors. This minor increase in size does not affect mass production. $\beta$ is the current amplification ratio of the bipolar type transistor. Although there are both a bipolar type transistor chip and a complementary MOS type of transistor chip in the circuit, this arrangement is not disadvantageous for assembly and mass production.

Figure 2:
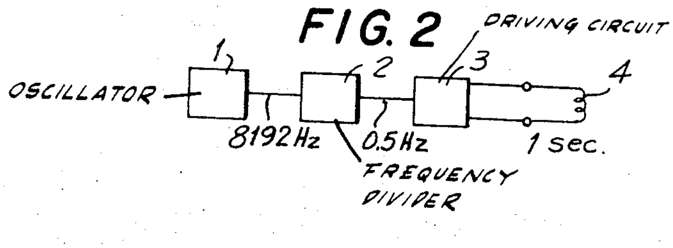
FIG. 2 is a block diagram of a quartz crystal wrist watch utilizing the arrangement according to the invention.

FIG. 2 is a block diagram of the quartz crystal timepiece according to the invention wherein 1 is an oscillator, 2 the frequency divider including the complementary MOS type integrated circuits, 3 the driving circuit including the bipolar type transistor integrated circuit, and 4 a load motor coil. An electric signal of 8,192 Hz produced from the oscillator 1 is reduced to 0.5 Hz by the frequency divider 2 and drives the motor coil at every other second through the driving circuit 3 including the bipolar type transistor integrated circuit.

Figure 3:
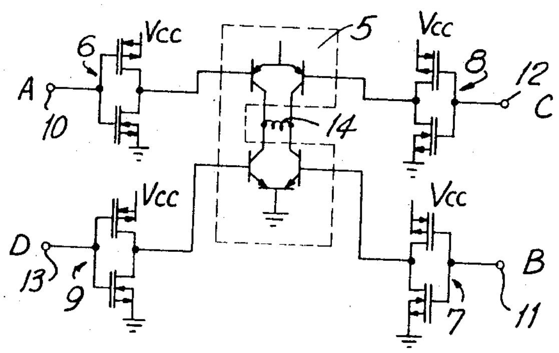
FIG. 3 is a circuit diagram of one embodiment of a driving circuit according to the invention.
Figure 4:
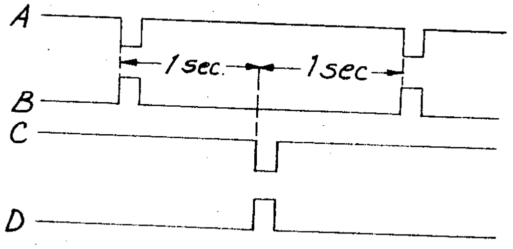
FIG. 4 shows the waveforms applied to the input terminals of the circuit of FIG. 3.

FIG. 3 shows one embodiment of the circuit according to the invention corresponding to driving circuit 3, portions of the complementary MOS integrated circuit chip 2 and the load motor coil 4 of FIG. 2. In FIG. 3, 6, 7, 8 and 9 are inverters serving as the output portions of the complementary MOS integrated circuit; 5 is the bipolar type transistor integrated circuit for driving; 14 is the load driving coil, and 10, 11, 12 and 13 are input terminals of inverters 6, 7, 8 and 9. The saturation currents of inverts 6, 7, 8 and 9 including said complementary MOS transistors are designed to be $1/\beta$ of the driving current flowing through said load coil 14 in order to control said bipolar type of transistor integrated circuit 5. Input waveforms of the signals applied to input terminals 9, 10, 11 and 12 of inverters 6, 7, 8 and 9 are shown respectively in waveforms A, B, C and D of FIG. 4. Current is supplied to the load motor coil 14 at every other second.

This invention provides a circuit for a quartz crystal wrist watch operated by low electric power using only chips as active elements. This is very advantageous for mass production of the circuits and furthermore for mass production of the quartz crystal wrist watches. The invention relates to quartz crystal wrist watches but can be applied to compact clocks or other timepieces controlled by crystals.

It will thus be seen that the objects set forth above, and those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A driving arrangement for a quartz crystal wrist watch comprising a crystal oscillator for producing a high frequency timing signal; a divider electronic circuit coupled to said oscillator and driven by said timing signal; and an electromechanical transducer, said divider electronic circuit including an active element having an insulated gate type transistor and a bipolar type transistor, said electro-mechanical transducer being connected to said bipolar type transistor as a load, said bipolar type transistor being controlled and switched by the saturation current flowing through said insulated gate type transistor.

2. A driving arrangement for a quartz crystal wrist watch as recited in claim 1, wherein said electromechanical transducer includes a driving coil, said divider electronic circuit including at least two pairs of bipolar type transistors each having an emitter, collector and gate and being connected as a complementary switch means with said driving coil in series with the emitter to collector paths of each of said pair of bipolar type transistors for the alternate passing of driving current to said driving coil in opposite directions, said divider electronic circuit including at least one insulated gate type transistor connected to the gate of each of said bipolar type transistors for controlling and switching said bipolar type transistors by the saturation current flowing through said insulated gate type transistors.

3. A driving arrangement for a quartz crystal wrist watch as recited in claim 2, wherein said divider electronic circuit includes complementary pairs of insulated gate type transistors connected to the gate of each of said bipolar type transistors for control and switching of said bipolar type transistors.

* * * * *